United States Patent [19]

Vermesse

[11] Patent Number: 4,473,783
[45] Date of Patent: Sep. 25, 1984

[54] MOTOR CONTROL CIRCUIT

[75] Inventor: Bernard Vermesse, Munich, Fed. Rep. of Germany

[73] Assignee: National Semiconductor Corporation, Santa Clara, Calif.

[21] Appl. No.: 496,690

[22] Filed: May 20, 1983

[51] Int. Cl.$^3$ .............................................. G05B 5/00
[52] U.S. Cl. .................... 318/331; 318/326; 318/317
[58] Field of Search ........................ 361/90, 23, 30, 31, 361/33; 318/312, 314, 317, 331, 326, 327, 310, 339, 346, 336, 494, 505, 434, 519

[56] References Cited

U.S. PATENT DOCUMENTS

| | | | |
|---|---|---|---|
| 3,229,182 | 1/1966 | Kubler | 318/331 |
| 3,230,440 | 1/1966 | Kleiner | 361/90 |
| 4,119,897 | 10/1978 | Skoog | 318/331 |
| 4,151,450 | 4/1979 | Fukuma et al. | 318/317 |
| 4,295,081 | 10/1981 | Bigley, Jr. et al. | 318/327 |
| 4,375,609 | 3/1983 | Wolf | 318/317 X |

*Primary Examiner*—Ulysses Weldon
*Attorney, Agent, or Firm*—Paul J. Winters; Michael J. Pollock; Gail W. Woodward

[57] ABSTRACT

A current limiting circuit, for a serial commutator motor, that monitors the flow of current through resistances chosen to model the motor, rather than the noisy flow of current through the motor itself. Current for one of the modeling resistances is derived from a tachometer on the motor and is thus proportional to motor speed.

3 Claims, 2 Drawing Figures

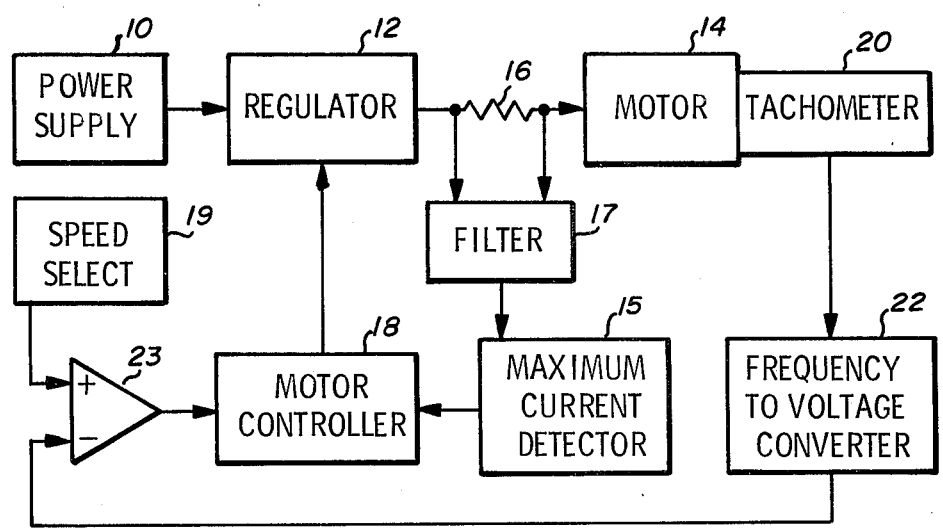
Fig_1 (PRIOR ART)
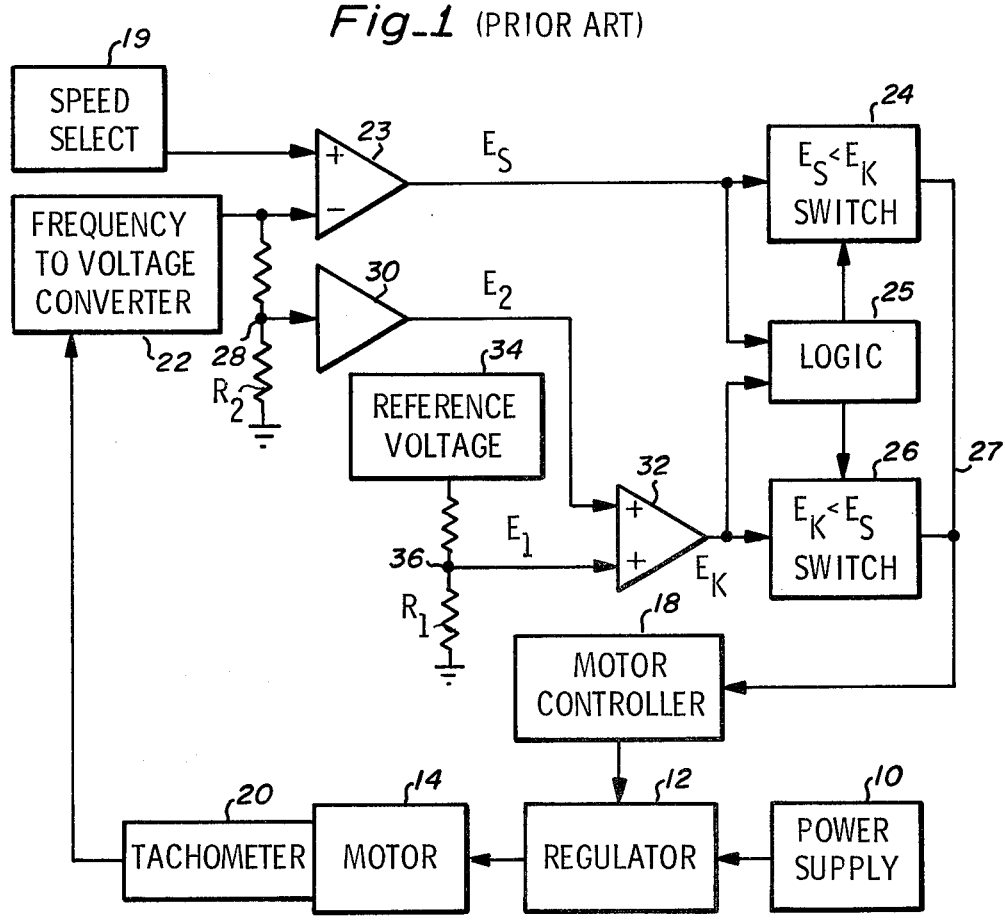
Fig_2

MOTOR CONTROL CIRCUIT

BACKGROUND OF THE INVENTION

Prior art motor controllers typically measure the speed of the motor and the current flowing through the motor and then regulate it by suitable controlling mechanisms so as to keep the speed constant, or keep the energy input as low as possible, or avoid excessive input current surges, or achieve any other desirable objective. The problem with this approach is that the operating characteristics of motors are such that the current flow is quite erratic, noisy, and chopped up. Hence, the current flow must be averaged over some minimum interval of time, with a filter or the like, in order to establish a reasonably accurate measure of the average current flow at any one time. Experience has shown that sudden load changes on the motor, or other momentary deviations in operation, can cause surges in current flow faster than the minimum interval of time needed for practical measurement. These surges may do damage to the motor or blow fuses. My invention solves these problems.

SUMMARY OF THE INVENTION

Briefly, the instant invention avoids measuring the noisy and erratic motor current and instead utilizes a speed proportional representative voltage generated from a tachometer on the motor. This representative voltage is then used directly or in combination with resistances chosen to duplicate the characteristic counter electromotive force (back EMF) and the internal resistance of the motor being controlled. Suitable logic circuits choose either the direct voltage or the resistance proportioned voltage (to which a fixed voltage is added) to control the motor depending on the speed range of the motor. This type of control system is particularly suitable for serial commutator motors of either AC or DC design. Additional advantages and improvements will become apparent from the following detailed description.

BRIEF DESCRIPTION OF THE DRAWING

FIG. 1 shows schematically the typical prior art approach to motor control.

FIG. 2 is a schematic diagram of the new control system of my invention.

DESCRIPTION OF THE PREFERRED EMBODIMENT

FIG. 1 shows the typical prior art approach to motor control. Power from a supply 10 is regulated through a regulator 12 which could comprise, for example, a triac switch or the like. A motor 14 receives current through an in series resistor 16. The voltage across resistor 16 is detected by a filter 17 that smooths out the irregular current flow through motor 14. Filter 17 presents a representative averaged voltage to a maximum current detector 15. Detector 15 provides a signal to a controller 18 whenever the current reaches a predetermined maximum limit so as to prevent controller 18 from causing regulator 12 to supply excessive current to motor 14. A differential amplifier 23 provides an indication of the difference in speed from that desired by comparing a voltage from speed select 19 with a voltage developed by a tachometer 20 and a frequency to voltage converter 22. Controller 18 acts as needed to reduce the differential voltage from amplifier 23 to zero subject to the maximum limit established by detector 15. Controller 18 may be as simple as an analog electronic circuit, or more sophisticated, making use of a microprocessor following a program of operation suitable for the application involved.

The main problem with systems of the type shown in FIG. 1 is that sudden large surges in current may be drawn from supply 10 before filter 17 can smooth out and indicate to controller 18 that a change in average current flow has taken place. This transient current spike causes sensitive fuses in the supply to blow unnecessarily and shortens the life of the motor. The present invention overcomes this problem with the control circuit shown in FIG. 2.

My invention does not measure the erratic current flow through the motor itself, but instead substitutes a more stable model of the motor that uses either digital circuits, controlled by suitable software programs, or analog circuits as described in FIG. 2. In FIG. 2, resistors $R_1$ and $R_2$ serve as analog models of the internal resistance and characteristic back EMF of the particular motor being controlled. As before, motor 14 receives current from supply 10 and regulator 12, regulator 12 being controlled by controller 18. The output of tachometer 20 is a signal of frequency dependent on motor speed which is converted into a voltage by a frequency to voltage converter 22. When the motor is running near the desired set speed, the voltage from converter 22 is simply compared to the desired voltage from speed select 19. Differential amplifier 23 provides an output voltage $E_S$ on line 27 that serves as a control voltage for controller 18. It should be noticed that this control voltage $E_S$ is selected by a logic circuit 25 because it is smaller than an alternative voltage $E_K$. Logic 25 compares voltages $E_S$ and $E_K$ and closes the appropriate switch to pass through the smaller voltage. In this case, $E_S$ is less than $E_K$, so switch 24 is closed. If a sudden load causes motor 14 to slow, thus causing a sudden increase in current demand, the slowing of tachometer 20 decreases the voltage from converter 22. A corresponding reduction in voltage at point 28 passes through amplifier 30 and 32 to become voltage $E_K$. Enough of a slow down makes voltage $E_K$ less than voltage $E_S$ and logic 25 opens switch 24 and closes switch 26 so that voltage $E_K$ is now present on line 27. Hence forth, the controller 18 tracks voltage $E_K$ and limits current flow through regulator 12 in accordance with the lower voltage $E_K$ rather than the quickly rising voltage $E_S$. Resistances $R_1$ and $R_2$ are chosen to provide a voltage $E_K$ on line 27, $E_K$ being the sum of voltages $E_1$ and $E_2$. Voltage $E_2$ is proportional to the speed of the motor (and thus proportional to the back EMF) and $E_1$ represents the internal resistance of the motor such that the current supplied to motor 14 by regulator 12 is of a constant value. Only after the motor has had time to accelerate closer to its normal set speed, so as to lower voltage $E_S$ to a safer level, below voltage $E_K$, will controller 18 again be allowed to respond to $E_S$ and operate in the normal speed regulation mode.

If the motor were to come to a stop, voltages $E_2$ and $E_K$ would go to zero and no current would flow to the motor. To avoid this, a minimum starting current is established by a resistor $R_1$ connected between a reference voltage 34 and ground so as to establish a fixed voltage $E_1$ at point 36. A summing amplifier 32 adds voltages $E_1$ and $E_2$ so that voltage $E_K$ is always at least equal to fixed voltage $E_1$.

It may thus be seen that resistor $R_1$ serves as a model of the internal resistance of motor 14, always establishing a minimum control voltage $E_1$ on line 27 to controller 18. Resistor $R_2$ serves as a model of the back EMF of motor 14, holding motor current constant for the condition where motor 14 is turning at a speed such that $E_2$ plus $E_1$ is less than $E_S$.

I claim:

1. A motor control circuit for use with serial commutator motors comprising in combination:

speed measuring means connected to the motor operable to produce a first voltage indicative of the speed of the motor;

motor controlling means operable to regulate the amount of power supplied to the motor in response to input control signals on an input control line;

speed select means;

comparing means connected to said speed select means and to said speed measuring means, operable to produce a first input control signal of proper magnitude to cause said motor controlling means to supply power of the correct amount to cause the motor to run at the speed selected by said speed select means;

motor modeling means having circuits chosen to simulate the internal resistance and counter electromotive force characteristics of the motor, said circuits connected to receive said first voltage from said speed measuring means and proportion said first voltage in a way characteristic of the motor so as to produce a second input control signal; and first logic means connected to said modeling means and said comparing means, operable to connect the lower voltage of said first and second input control signals to said input control line on said motor controlling means so that said motor controlling means is controlled by the lowest voltage input control signal from either the modeling means or the comparing means.

2. The circuit of claim 1 in which said modeling means comprise resistive circuits that have a first resistance connected between a reference voltage and said speed measuring means so as to simulate the counter electromotive force of the motor and produce a voltage proportional to the speed of the motor and that further have a second resistance connected to establish a fixed minimum voltage so as to simulate the internal resistance of the motor, said motor modeling means operable to output the sum of said proportional and fixed minimum voltages from the first and second resistances as said second input control signal.

3. The circuit of claim 2 in which said speed measuring means comprises a tachometer connected to the motor along with means to convert the output of the tachometer to a speed representative voltage signal so as to provide said first voltage.

* * * * *